(12) United States Patent
Schneider et al.

(10) Patent No.: US 9,481,485 B2
(45) Date of Patent: Nov. 1, 2016

(54) WAVE-TYPE PRESSURE COMPENSATING BASES FOR POLYMERIC CONTAINERS

(71) Applicant: Graham Packaging LC, L.P., York, PA (US)

(72) Inventors: Mark D. Schneider, St. Charles, IL (US); Matt Vogel, Lees Summit, MO (US); Samuel E. Evins, Olathe, KS (US); Kerry W. Silvers, Campbellsburg, IN (US)

(73) Assignee: Graham Packaging PET Technologies, Inc., Lancaster, PA (US)

( * ) Notice: Subject to any disclaimer, the term of this patent is extended or adjusted under 35 U.S.C. 154(b) by 135 days.

(21) Appl. No.: 13/896,683

(22) Filed: May 17, 2013

(65) Prior Publication Data

US 2013/0248539 A1    Sep. 26, 2013

Related U.S. Application Data

(62) Division of application No. 12/709,302, filed on Feb. 19, 2010, now Pat. No. 8,444,002.

(51) Int. Cl.
   *B65D 8/04*    (2006.01)
   *B65D 1/40*    (2006.01)
   *B29C 49/54*   (2006.01)
   (Continued)

(52) U.S. Cl.
   CPC .............. *B65D 1/40* (2013.01); *B29C 49/541* (2013.01); *B65D 1/0276* (2013.01); *B65D 79/005* (2013.01); *B29C 49/04* (2013.01); *B29C 49/12* (2013.01); *B29C 2049/4892* (2013.01); *B29K 2995/00* (2013.01); *B29L 2031/716* (2013.01)

(58) Field of Classification Search
   CPC ........ B65D 1/42; B65D 1/0276; B65D 1/40; B65D 1/165; B65D 79/005
   See application file for complete search history.

(56) References Cited

U.S. PATENT DOCUMENTS 4,465,199 A    8/1984 Aoki
4,577,775 A    3/1986 Kresin
(Continued)

FOREIGN PATENT DOCUMENTS

FR    2508004      12/1982
JP    05254531     10/1993
JP    2001088202    4/2001

OTHER PUBLICATIONS

International Search Report and Written Opinion for corresponding international patent application No. PCT/US2011/025254 dated Nov. 8, 2011.

*Primary Examiner* — Jeffrey Allen
(74) *Attorney, Agent, or Firm* — Stradley Ronon Stevens & Young, LLP

(57) ABSTRACT

A plastic container having a sidewall defining a chamber and having a first end and a second end and an opening at the first end into the chamber. A base of the container extends from the sidewall and closes the second end, the base having an outer perimeter portion defining a support structure, an axially inwardly extending perimeter wall spaced radially inwardly from the support structure forming an angle with a horizontal line of greater than about 80°, a centrally disposed pushup section in the shape of an axially inwardly extending truncated cone, and a toroidal-shaped channel circumscribing and connecting the perimeter wall to the pushup section. The toroidal-shaped channel has a surface that is asymmetrical about a central axis of the container when the container is under static pressure conditions.

26 Claims, 12 Drawing Sheets

(51) Int. Cl.
  *B65D 1/02* (2006.01)
  *B65D 79/00* (2006.01)
  *B29C 49/04* (2006.01)
  *B29C 49/12* (2006.01)
  *B29C 49/48* (2006.01)
  *B29L 31/00* (2006.01)

(56) References Cited

U.S. PATENT DOCUMENTS

| | | | |
|---|---|---|---|
| 4,667,454 A * | 5/1987 | McHenry | B65B 55/02 |
| | | | 426/401 |
| 4,880,129 A | 11/1989 | McHenry et al. | |
| 5,234,126 A | 8/1993 | Jonas et al. | |
| 5,593,063 A | 1/1997 | Claydon et al. | |
| 5,727,710 A | 3/1998 | Severus et al. | |
| 6,595,380 B2 | 7/2003 | Silvers | |
| 6,857,531 B2 | 2/2005 | Slat et al. | |
| 6,942,116 B2 | 9/2005 | Lisch et al. | |
| 6,983,858 B2 | 1/2006 | Slat et al. | |
| 7,150,372 B2 | 12/2006 | Lisch et al. | |
| 7,416,088 B2 | 8/2008 | Boukobza | |
| 7,451,886 B2 | 11/2008 | Lisch et al. | |
| 2002/0074336 A1 | 6/2002 | Silvers | |
| 2004/0144748 A1 | 7/2004 | Slat et al. | |
| 2006/0231985 A1* | 10/2006 | Kelley | 264/523 |
| 2007/0215571 A1 | 9/2007 | Trude | |
| 2008/0047964 A1* | 2/2008 | Denner et al. | 220/624 |
| 2009/0159556 A1 | 6/2009 | Patcheak et al. | |
| 2009/0202766 A1* | 8/2009 | Beuerle et al. | 428/36.9 |
| 2011/0070388 A1 | 3/2011 | Schneider et al. | |

* cited by examiner

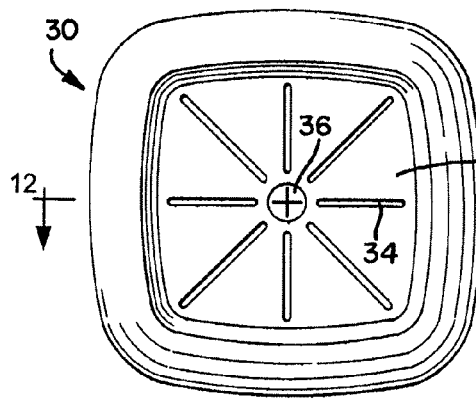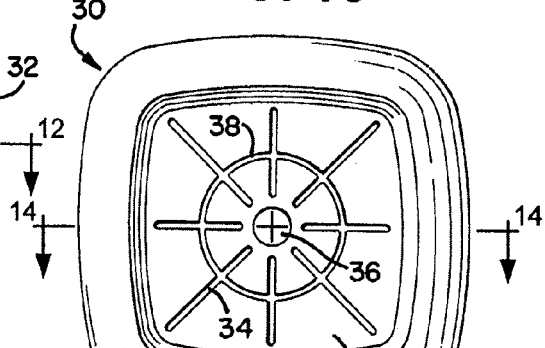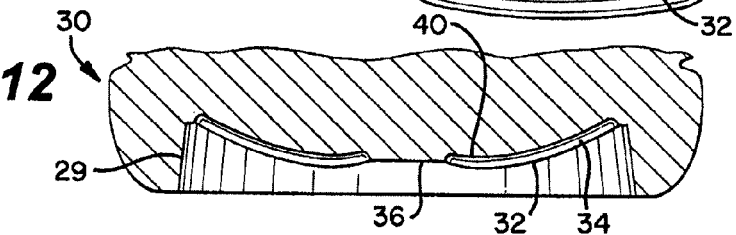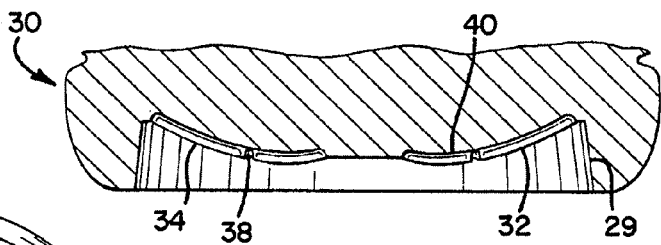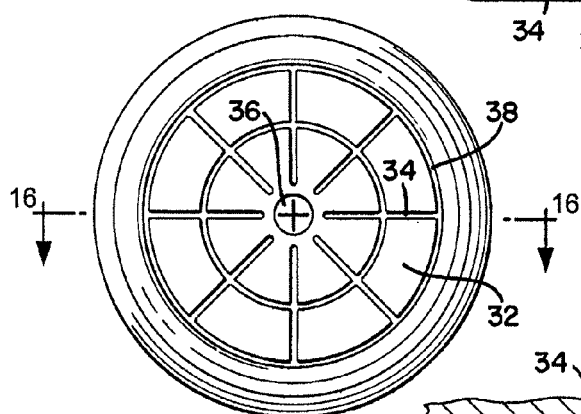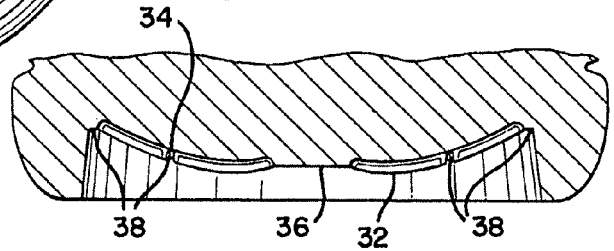

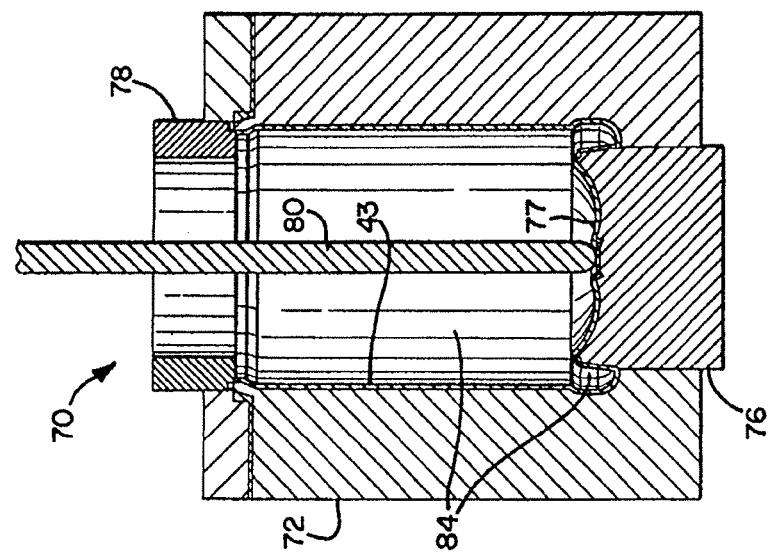
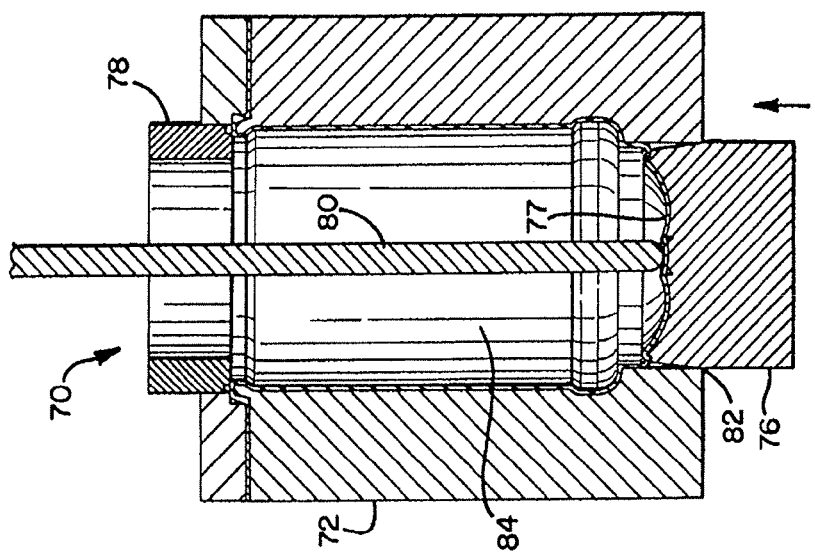
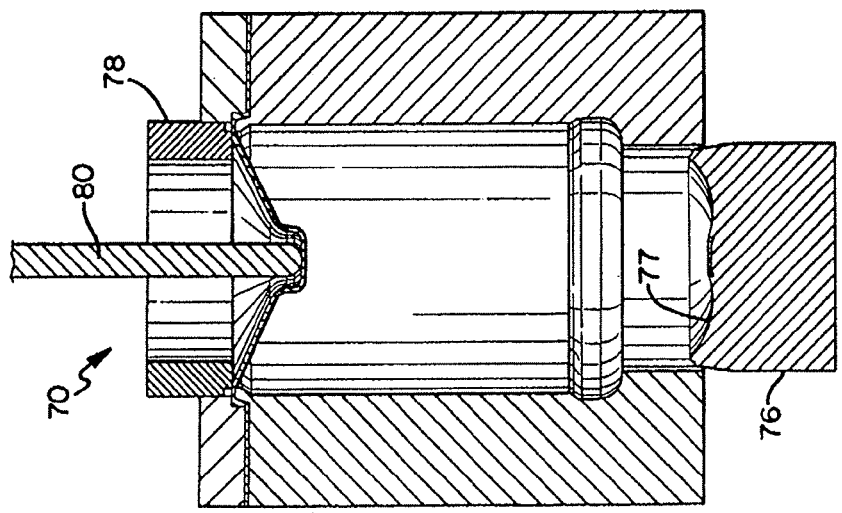

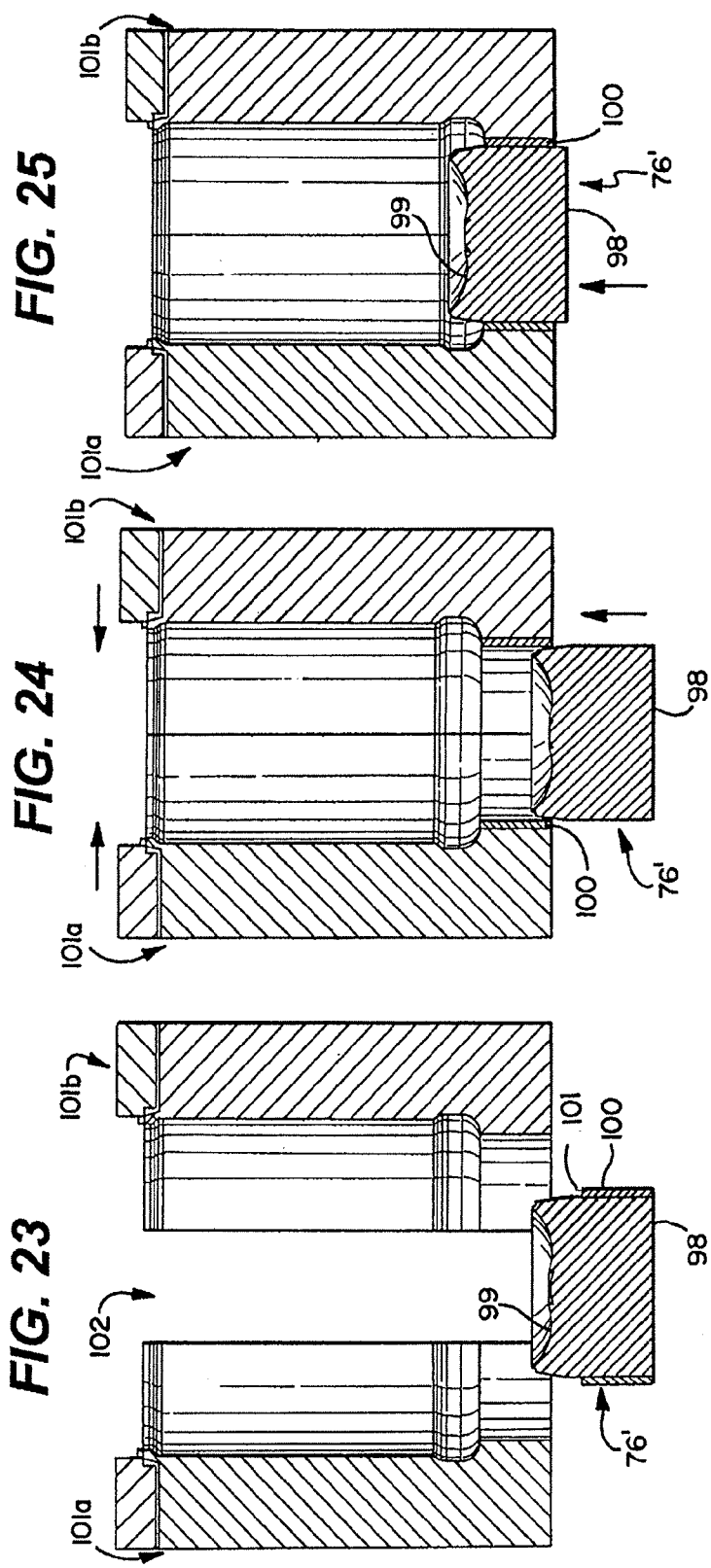

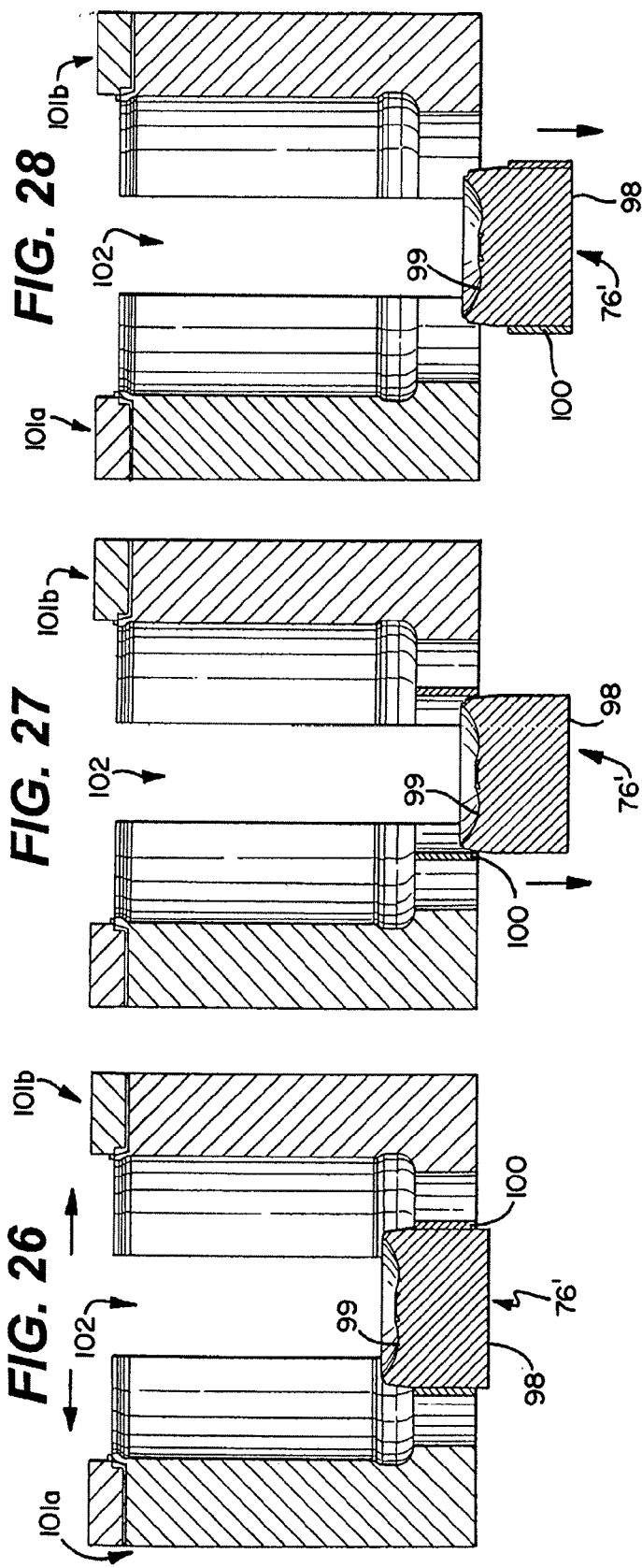

WAVE-TYPE PRESSURE COMPENSATING BASES FOR POLYMERIC CONTAINERS

RELATED APPLICATION

The present application claims priority as a divisional of "parent" U.S. patent application Ser. No. 12/709,302, which will issue as U.S. Pat. No. 8,444,002 on May 21, 2013. The parent application was filed on behalf of the inventors and was assigned to the assignee of the present application, and is incorporated in the present application by reference.

BACKGROUND OF THE INVENTION

1. Technical Field

This invention relates to pressure compensating bases for polymeric containers used in hot fill, pasteurization, and retort applications.

2. Background Art

Blow molding processes for forming polymeric containers are well known in the art. Blown polymeric containers have replaced metal and glass containers in numerous food storage applications such as carbonated soft drinks and lower temperature filled food products such as peanut butter and mayonnaise. However, certain prior art containers such as polyethylene terephthalate ("PET") containers have not replaced metal and glass containers for product storage and processing applications where the container is filled or heated to temperatures above 97° C. (207° F.) as such containers experience significant shrinkage deformation rendering the container unusable.

Additional in-roads into the replacement of glass are desired in food processing applications such as low-temperature pasteurization, high-temperature pasteurization, and retort. Low temperature pasteurization includes the pasteurization of liquid products such as beer and tea. High temperature pasteurization processes are for solid food products such as pickles that have slower heat transfer rates and require temperatures in excess of 100° C. (212° F.). Retort processes are for pasteurizing low acid products and require temperatures from 100° C. to 130° C. (212° F. to 266° F.) and pressures sufficient to maintain water in a liquid state.

In numerous food storage applications, polymeric containers are filled with a hot liquid or solid material, the container is capped and then allowed to cool. To compensate for the change in volume inside the container it is known to provide pressure compensating features in various locations on the container sidewall including the dome, the barrel, and the bottom panel. The pressure compensating features move in response to pressure changes to decrease or increase the volume as needed. United States Publication Nos. 2009/0202766 and 2009/0159556 and U.S. Pat. Nos. 7,451,886; 7,150,372; 6,942,116; and 6,595,380 disclose a volume compensating feature on a bottom panel of the container having a centrally disposed, generally inverted, cone shaped, push-up section that extends to an axially inwardly most point when compared to other portions of the bottom panel. The push up section is connected by a generally S-shaped panel to a standing ring. The S-shaped panel inverts to compensate for negative pressure in the container. The '556 publication further discloses providing a plurality of axially spaced, circumferentially extending grooves on the S-shaped panel that extend through the entire thickness of the wall and form ribs on an opposite side of the groove or a plurality of circumferentially and axially spaced dimples. The bottom panels are symmetrically disposed about an axis of the container.

U.S. Pat. Nos. 6,983,858; 6,857,531; and 5,234,126 disclose a pressure compensating base for a polymeric container that under static pressure the bottom panel is convex, or extends axially outwardly, and snaps through to a concave configuration, or extends axially inwardly, when a specific pressure is reached within the container.

United States Patent Application Publication No. 2006/0231985 discloses a method and apparatus for manufacturing a blow molded container. A parison is mounted within a mold assembly having two side molds and a base mold. The parison is inflated in contact with surfaces of the mold assembly to form a container with a bottom wall having a moveable region. The moveable region is downwardly convex with respect to a bearing surface and has a centrally disposed dimple. After the inflation step is complete, a rod mounted within the base mold for reciprocating translational motion along an axis of the container is moved axially inwardly so that a rod end engages the dimple of the moveable region to reposition the moveable region axially inwardly to an interior portion of the container with respect to the bearing surface.

United States Patent Publication No. 2008/0047964 discloses a plastic container having an invertible base for pressure compensation. A pressure panel is deeply set into the container and is moveable between an outwardly inclined position to an inwardly inclined position to reduce the internal volume of the container and to compensate for vacuum forces created during a hot-fill process. The pressure panel is connected to the standing ring by an inner wall that is parallel or nearly parallel to a longitudinal axis of the container. To facilitate movement of the pressure panel between the outwardly inclined position to the inwardly inclined position, the pressure panel can include a hinge structure that is located between the inner wall and the pressure panel. The pressure panel can have an initiator portion and a control portion where the control portion has a steeper angle with respect to a standing plane than the initiator portion. The '964 application further discloses a pressure panel divided into fluted regions to create regions of lesser and greater angular inclination.

To overcome the shortcomings of known containers, a new plastic container having pressure compensating features is provided. The container may have a pressure compensating base capable of progressively yielding under pressure. The pressure compensating base of the present invention will allow for all other surfaces of the container to be free of pressure compensating features. These and other aspects and attributes of the present invention will be discussed with reference to the following drawings and accompanying specification.

SUMMARY OF THE INVENTION

The present invention provides a plastic container having a sidewall defining a chamber and having a first end and a second end and an opening at the first end into the chamber. A base of the container extends from the sidewall and closes the second end, the base having an outer perimeter portion defining a support structure, an axially inwardly extending perimeter wall spaced radially inwardly from the support structure forming an angle with a horizontal line of greater than about 80°, a centrally disposed pushup section in the shape of an axially inwardly extending truncated cone, and a toroidal-shaped channel circumscribing and connecting the perimeter wall to the pushup section. The toroidal-shaped channel has a surface that is asymmetrical about a central axis of the container when the container is under static pressure conditions.

It is to be understood that both the foregoing general description and the following detailed description are exemplary, but are not restrictive, of the invention.

BRIEF DESCRIPTION OF THE DRAWINGS

FIGS. 11-14 show two embodiments of a hinge-type base having a generally square pressure relief section respectively showing a bottom view and a side sectional view of each embodiment;

FIGS. 15 and 16 show a hinge-type base having a round pressure relief section having eight radial hinges and two circumferential hinges respectively showing a bottom view and a side sectional view;

FIG. 20 is a side elevation view in cross-section of a blow station with a stretch rod partially inserted into a blow mold;

FIG. 21 is a side elevation view in cross-section of the blow station with the stretch rod fully inserted into the blow mold and stretching an intermediate container into an overstretched condition;

FIG. 22 is a side elevation view in cross-section of the blow station showing the forming of the bottom container with a stretch rod and a pushup member;

FIG. 23 is a side elevation view in cross-section of the blow station having a blow mold in an open condition with a two-piece pushup member in a retracted position;

FIG. 24 is a side elevation view in cross-section of the blow station with the blow mold moving to a closed position and a first portion of the pushup in a molding position and a second portion in a retracted position;

FIG. 25 is a side elevation view in cross-section of the blow station with the blow mold in a closed position with the first portion and the second portion of the pushup in a molding position;

FIG. 26 is a side elevation view of the blow mold moving to an open position with the first and second portions of the pushup inserted into the mold cavity;

FIG. 27 is a side elevation view of the blow mold in an open position with the first portion of the pushup inserted into the mold cavity and the second portion in a retracted position;

FIG. 28 is a side elevation view of the blow mold moving to an open position with the first and second portions of the pushup in a retracted position;

DETAILED DESCRIPTION OF THE INVENTION

Figure 1:
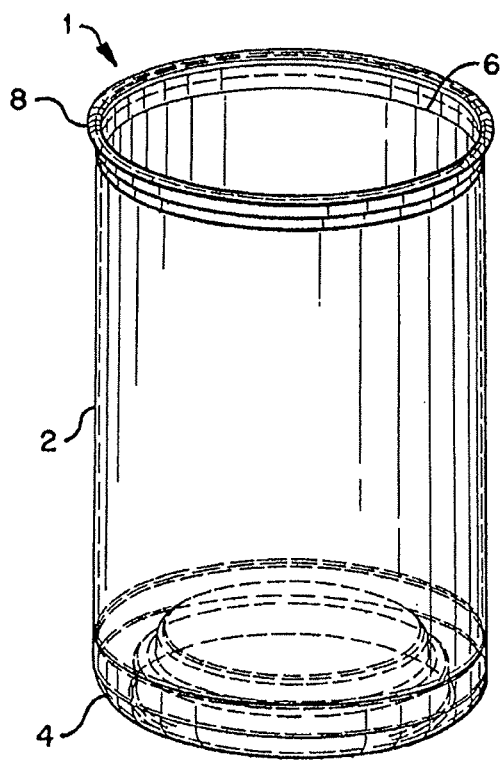
FIG. 1 is a perspective view of a jar-type container.

While this invention is susceptible of embodiment in many different forms, there are shown in the drawings, and will be described herein in detail, specific embodiments thereof with the understanding that the present disclosure is to be considered as an exemplification of the principles of the invention and is not intended to limit the invention to the specific embodiments illustrated.

The present invention provides pressure compensating bases for polymeric containers and more preferably for containers of a crystallizable polymer having enhanced thermal properties while still providing a container with high clarity. Suitable crystallizable polymers include, for example, homopolymers of poly (ethylene terephthalate) and phthalic based copolymers ("PET"), polyolefins, polypropylene and polyethylene. Suitable polyolefins include homopolymers and copolymers of olefins with comonomers of olefins, ethers, esters, amides and others well known to those skilled in the art. Suitable polyethylenes include homopolymers and copolymers of ethylene and also include high, medium and low density polyethylenes.

In a preferred form of the invention, the containers will be fabricated from PET resin having an intrinsic viscosity from 0.72 to about 0.86. Suitable PET resins include bottle grade PET resins including PARASTAR resins sold by the Eastman Chemical Company, PET resins sold by Wellman, Inc., and CLEAR TUF resins sold by M&G Polymers. The crystallizable polymer containers of the present invention can have any geometry, shape, or size without departing from the present invention and include containers that are round, oval, polygonal, and irregular. Suitable containers can be a jar-type, can-type, carafe, wide mouth, and any other type of container known to those of ordinary skill in the art. Suitable features of the containers can include pressure absorbing features, grip enhancing features, shoulders, bumpers, finishes, chimes, standing rings, necks, and others known to those of ordinary skill in the art.

Figure 2:
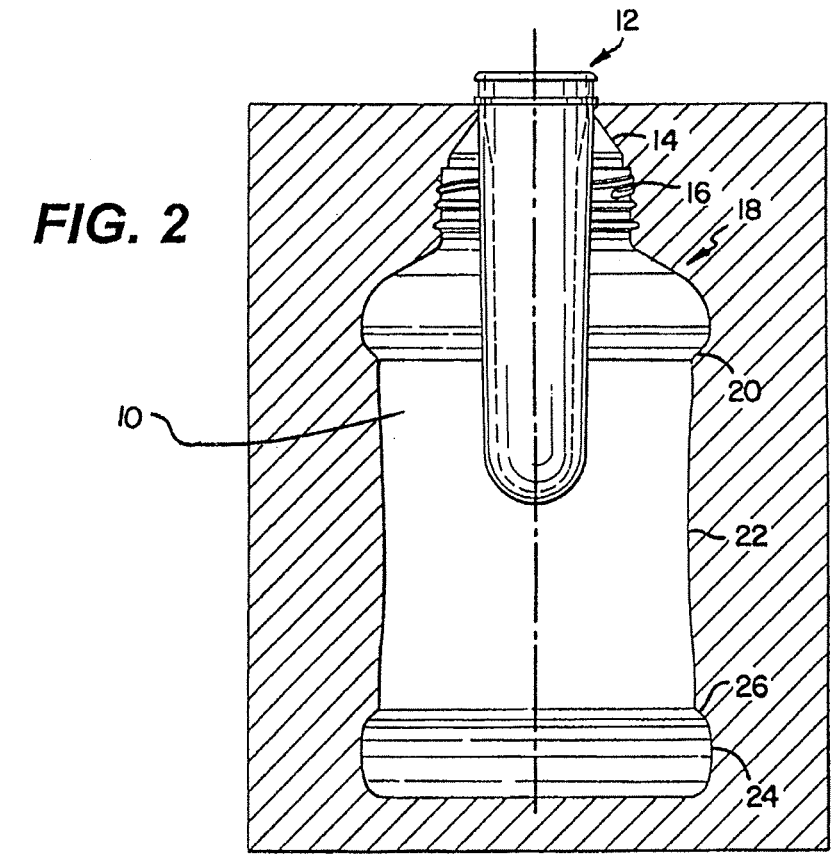
FIG. 2 is a side elevation view showing a preform overlaid onto a mold cavity for a jar-type container.
Figure 3:
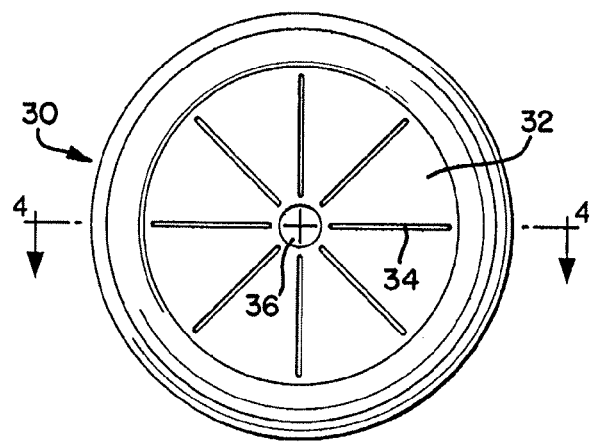
FIGS. 3-10 show four embodiments of a hinge-type base having a generally round bottom pressure relief section respectively showing a bottom view and a side sectional view of each embodiment.
Figure 4:
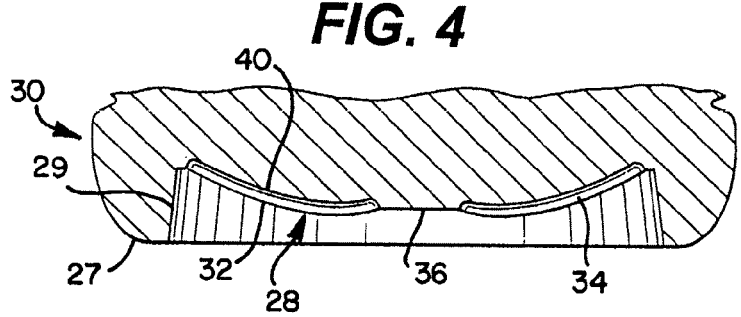
Figure 5:
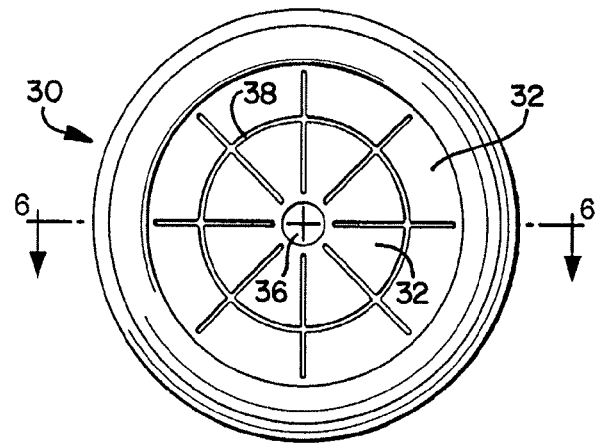
Figure 6:
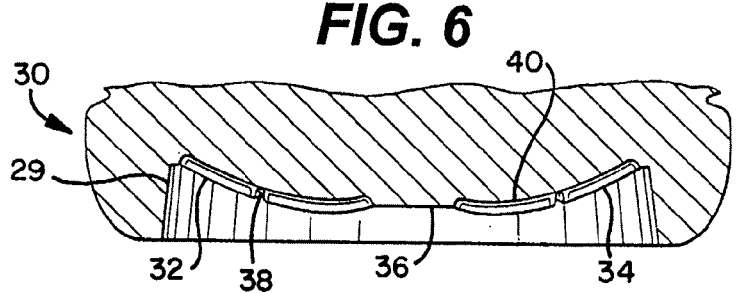
Figure 7:
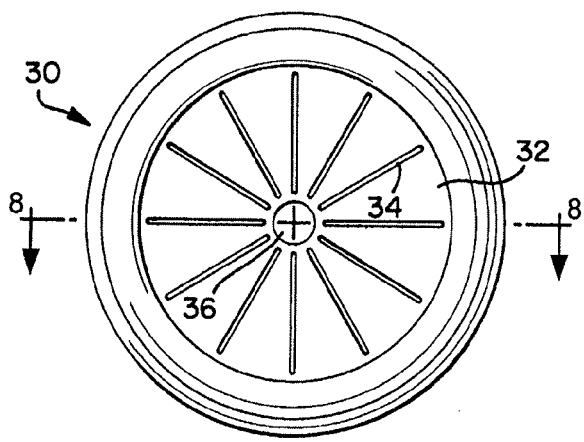
Figure 8:
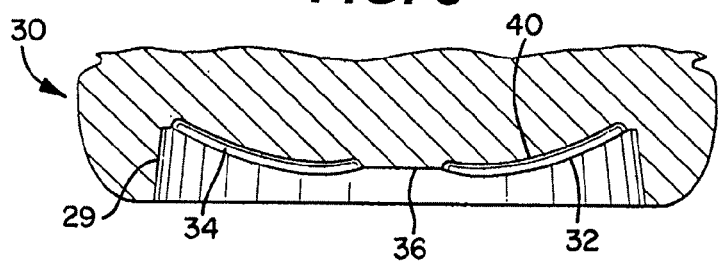
Figure 9:
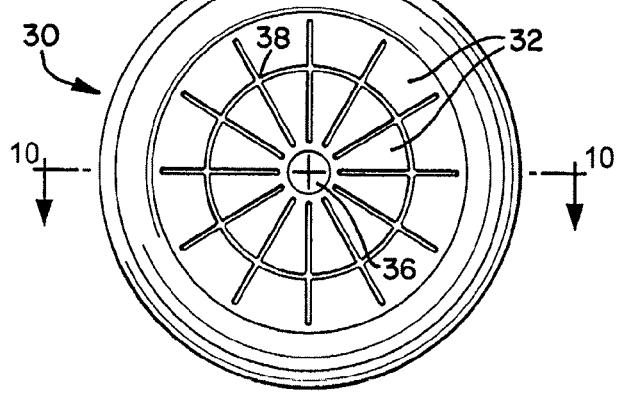
Figure 10:
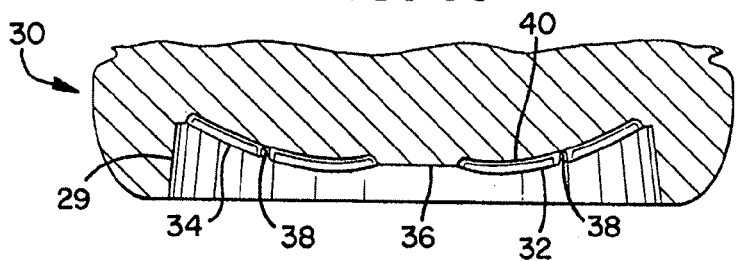

FIG. 1 shows one container of the present invention in the form of a can 1, having a generally cylindrical sidewall 2, a pressure compensating base 4, and an open top 6 circumscribed by a flange section 8. FIG. 2 shows a mold cavity 10 and a preform 12 for forming a jar-type container having a conical top section 14, a finish section 16, a shoulder section 18, a first bumper section 20, a sidewall or barrel section 22, a bottom section 24, and a second bumper section 26. The pressure compensating base 4 has a standing ring 27 forming a support structure and having a first outer diameter (FIG. 4).

An upstanding wall 29 extends axially inwardly and forms an angle with respect to the horizontal support line of greater than about 80° and more preferably from about 80° to about 90°. Spanning a top end 54 of the upstanding wall 29 is a pressure compensating panel 28 having a second diameter (FIGS. 4 and 17) from about 70% to about 95% of the standing ring first diameter, more preferably from about 80% to about 95% and most preferably from about 85% to about 93%. Containers of the present invention include those volumes that are commonly used in the food industry and chemical industry and can include, for example, from 4 oz. to 128 oz. However, it should be understood the present invention should not be limited to this volume range.

In a preferred form of the invention, the containers will be formed on an integrated platform with a blow mold station. What is meant by an integrated platform is that the preform 12 is formed in line with the blow mold cavities. Thus, the preform 12 does not have to be reheated to a preferred orientation temperature as is required of non-integrated platforms. Further, in non-integrated platforms, preforms may increase in moisture content over time which is undesirable. Accordingly, the preform of an integrated system will have a single heat history unlike a preform that is formed, cooled, and then reheated to the desired orientation temperature and, therefore, has multiple heat histories. In a preferred form of the invention, the preform 12 will have a moisture content of less than about 30 ppm.

In a preferred form of the invention of FIG. 2, the single-heat history preform 12 will be disposed within a blow mold cavity 10 of a blow station having a temperature higher than the glass transition temperature ("Tg"), and more preferably within the range of 73° C. to 250° C. (163° F. to 482° F.), more preferably 150° C.-240° C. (302° F. to 464° F.), more preferably 30° C.-230° C. (86° F. to 446° F.), and most preferably from 30° C.-200° C. (86° F. to 392° F.) and any range or combination of ranges therein. The container will remain in the mold from about two seconds to about twenty seconds, more preferably from about two seconds to fifteen seconds, more preferably from about two seconds to about twelve seconds, more preferably from about four seconds to twelve seconds, and most preferably from about six seconds to about twelve seconds. A more detailed description of the preferred method of forming a PET container with enhanced thermal stability is set forth below with reference to FIGS. 23-28 and in co-pending and commonly assigned U.S. patent application Ser. No. 12/564,845, now allowed, which is incorporated in its entirety herein by reference and made a part hereof.

In a preferred form of the invention, the container will have sidewalls of varying thicknesses and more preferably the thickness of the pressure compensating panel 28 will be thinner than the thickness of the sidewall 2 (FIGS. 1) and 22 (FIG. 2). In one preferred form of the invention the thickness of the pressure compensating panel 28 will be from about 30% to about 60% thinner than the thickness of the sidewalls 2 and 22. Wall thicknesses in the base area can vary but for food container applications the thickness of the wall in the base area will be from about 0.012" (0.030 cm) to about 0.016" (0.040 cm).

In a preferred form of the invention, the pressure compensating base 4 will be capable of progressively yielding under pressure. FIGS. 3-14 show various embodiments of a pressure compensating base 4 each having panels divided by hinges. Accordingly, this type of pressure compensating base will sometimes be referred to as a hinged-type base 30. FIGS. 29-32 show various embodiments of a pressure compensating base 4 having an asymmetric structure that progressively yields. This type of base may sometimes be referred to as a wave base. In preferred forms of the invention, both the hinged-type base and the wave-type base will compensate for pressure differences so that the barrel section has a continuous surface uninterrupted by pressure compensating structures such as indentations, ribs, or other pressure compensating features. In another preferred form of the invention, the pressure compensating bases 4 of the present invention will allow for all other surfaces of the container to be free of pressure compensating features.

In a preferred form of the invention, the hinged-type base 30 will have at least two panels 32 divided by a groove or hinge 34 and a centrally positioned push up section 36. The present invention contemplates having any number of grooves or hinges 34 including, for example, from 1 groove or hinge to 100 grooves or hinges. The grooves or hinges 34 can extend along a line in any direction including axially, circumferentially, or along a chord ("chordally") and any combinations of these. Also, the groove 34 can extend axially inwardly of the pressure compensating base 4 or axially outwardly of the pressure compensating base 4. A groove 34 is shown, in a preferred form, as a groove through the partial thickness of a wall of the base 4, with no interruption of an opposing wall surface, and provides a line along which the two panels 32 can flex. It is contemplated that the groove 34 could also extend through the entire thickness of the panel 32 and form an upstanding rib on an opposing surface. The present invention contemplates having a base 30 having all axially inwardly extending grooves 34, a side with all axially outwardly extending grooves 34, or a side with a combination of axially inwardly and axially outwardly extending grooves 34.

FIGS. 3, 4 and FIGS. 11, 12 respectively show a hinged-type round bottom and square bottom container each having eight circumferentially spaced and radially extending hinges 34 and eight panels 32. In a preferred form of the invention, the radial hinges 34 will be substantially equally spaced from one another and in the case of eight hinges 34 each hinge 34 is spaced from adjacent hinges 34 by 40 degrees. The axially extending hinges 34, in a preferred form of the invention, will not extend beyond the diameter of the pressure compensating panel 28, and more preferably will initiate proximate the upstanding wall 29, without touching the upstanding wall 29, and terminate short of the pushup section 36. The length of the grooves 34 will be from about 85% to about 100% of the first diameter of the standing ring 27. The grooves 34 will preferably have a width from about 0.030 inches (0.076 cm) to about 0.080 inches (0.203 cm), more preferably from about 0.035 inches (0.089 cm) to about 0.065 inches (0.165 cm), and most preferably from 0.035 inches (0.089 cm) to about 0.045 inches (0.114 cm). The grooves 34 will also have a depth of from about 0.045 inches (0.114 cm) to about 0.120 inches (0.305 cm), more preferably from about 0.050 inches (0.127 cm) to about 0.100 inches (0.254 cm), and most preferably from about 0.055 inches (0.139 cm) to about 0.080 inches (0.203 cm).

FIGS. 5, 6 and FIGS. 13, 14 respectively show a hinged-type round bottom and square bottom each having a combination of eight circumferentially spaced and radially extending hinges 34 and a circumferentially extending hinge 38 that intersects each of the radially extending hinges along an intermediate portion of the length of the radial hinges. The circumferential hinge 38 is concentrically disposed and has a diameter of from about 45% to about 75% of the diameter of the standing ring 27. It is contemplated providing additional circumferential hinges 38 radially spaced from one another including two or more circumferential hinges 38 (FIGS. 15 and 16). FIGS. 7-10 show a similar structure but with twelve radial hinges instead of eight.

FIGS. 4, 6, 8, 10, 12, and 14 show, in one preferred form of the invention, when the container is at static pressure, the panels 32 have a curved outer surface 40 tapering axially outwardly from a radial outward end to a radial inward end. The radial inward end terminates proximate the push up section 36.

Figure 17:
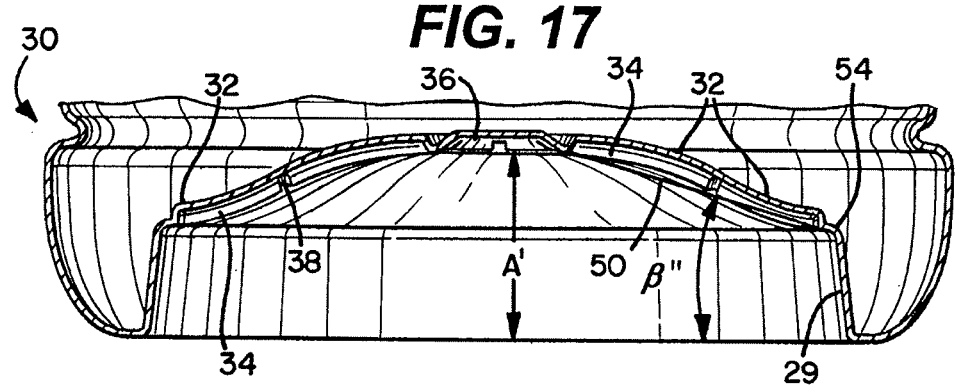
FIGS. 17-19 show side elevation views of the hinge base on the container of FIG. 5 taken along line 6-6 under various pressure conditions including respectively under vacuum, static pressure and positive pressure.
Figure 18:
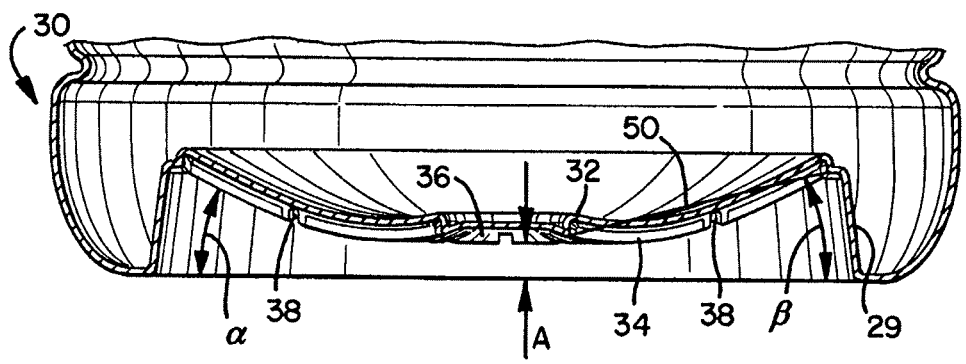
Figure 19:
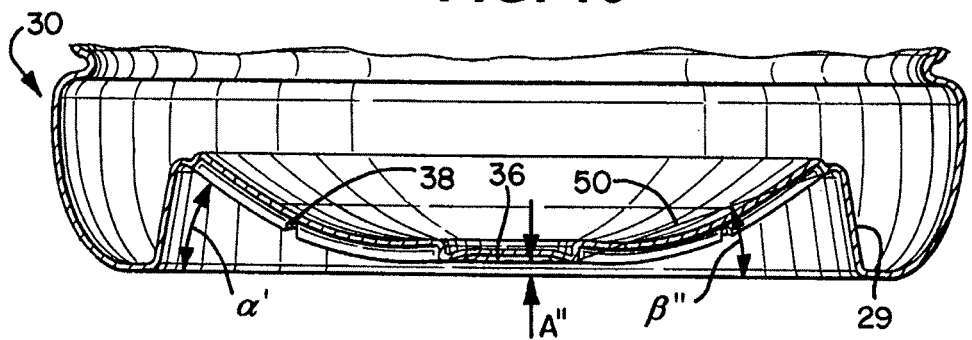
Figure 43:
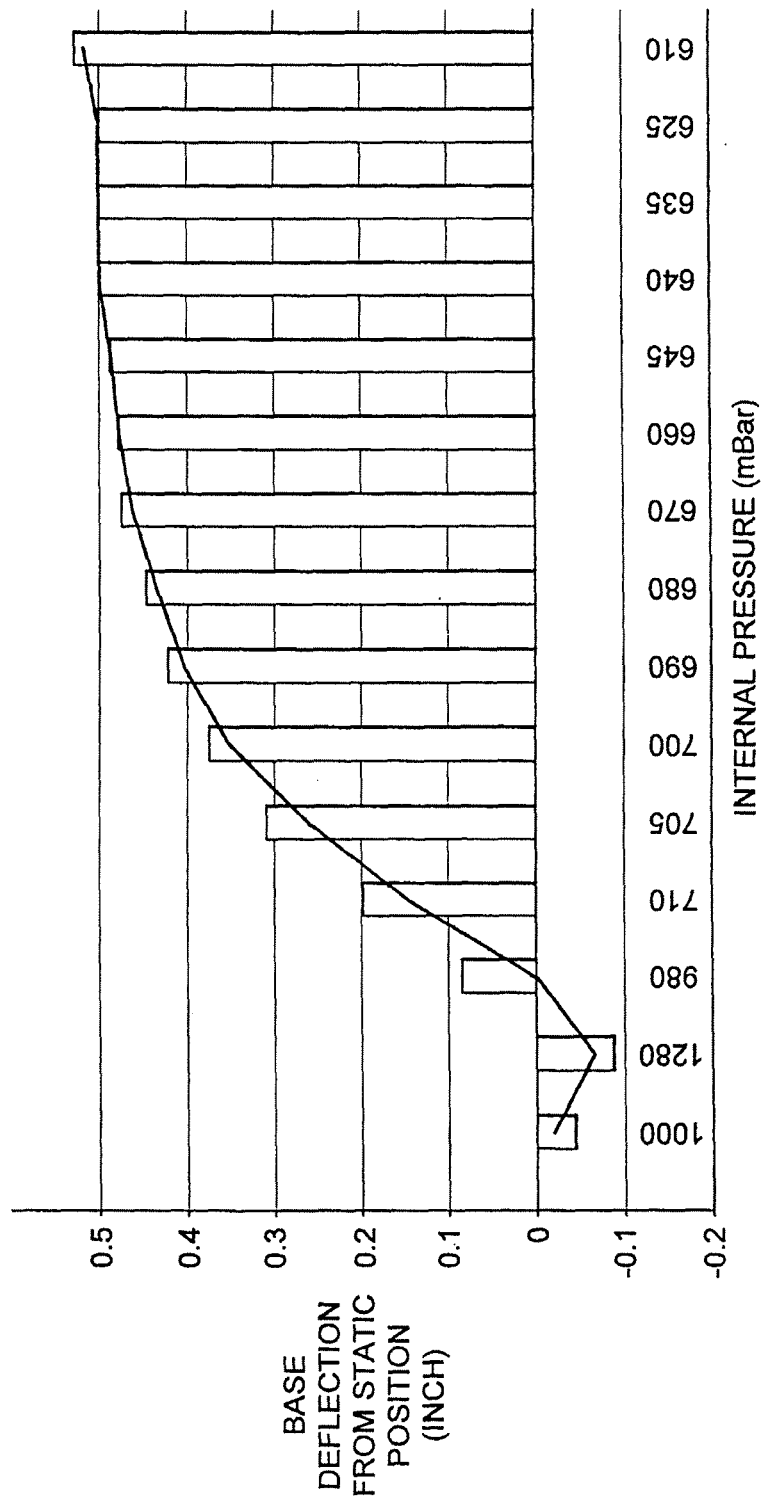
FIG. 43 shows a plot of a deflection curve for a container having the pressure compensating panel shown in FIGS. 5 and 17-19 when the container is filled with boiling water and capped, with the distance of deflection of the pressure panel measured from a static position plotted in inches on the y-axis and the amount of internal pressure of the container plotted on the x-axis in millibars.

FIGS. 17-19 show the hinged-type base 30 under various pressure conditions within the container. FIG. 43 shows a plot of a deflection curve for a container having the pressure compensating panel shown in FIGS. 5 and 17-19 when the container is filled with boiling water and capped, with the distance of deflection of the pressure panel measured from a static position plotted in inches on the y-axis and the amount of internal pressure of the container plotted on the x-axis in millibars. FIG. 17 shows the pressure relief panel fully inverted to compensate for a vacuum or negative pressure within the container. Because the pressure compensating panel 28 has numerous hinges 34 and panels 32, the panels 32 can progressively yield or yield simultaneously depending on the pressure difference between the inside of the container and the outside of the container. FIGS. 17-19 show end points in the yielding process. When in the static or positive pressure environments (FIGS. 18 and 19), the central portion or pushup section 36 of the panel 32 is below the top end 54 of the upstanding perimeter wall 29 and, when under vacuum conditions (FIG. 17), the central portion or pushup section 32 is above the top end 54 of the upstanding perimeter wall 29.

In a preferred form of the invention, when the container is at static pressure (FIG. 18), the angle α formed between a horizontal line and a bottom surface of a panel 32 will be within the range of 15° to 45°, and more preferably between 18° to about 35°, and most preferably from about 20° to about 33°. Further, in a preferred form of the invention, the angle β between a line 50 representing the average radii of curvature (drawn between the highest point on the panel (axial inward most point) to the lowest point (axial outward most point) will be within the range of 5° to about 30°, more preferably from about 10° to 25°, and most preferably from about 10° to about 20°.

When the container is under a vacuum (FIG. 17), in a preferred form of the invention, the angle β' will be greater than the angle β by 2° to about 15° and more preferably from 2° to about 10°. Also, in a preferred form of the invention, the angle β' will be within the range of 10° to about 45°, more preferably from about 13° to about 33°, and most preferably from about 13° to about 25°.

When the container is under positive pressure (FIG. 19), the angle α' will be from about 20° to about 50°, more preferably from about 23° to about 45°, and most preferably from about 25° to about 40°. Also, in a preferred form of the invention, the angle β" will be within the range of 15° to 40°, more preferably from about 15° to about 33°, and most preferably from about 15° to about 30°.

When the container is under static pressure (FIG. 18), a distance A from a support surface to the central portion or pushup section 36 will be about 0.180 inches (0.457 cm) to about 0.360 inches (0.914 cm) for a container having a standing ring 27 with a diameter of from about 2.500 inches (6.350 cm) to about 3.000 inches (7.620 cm). Thus, the ratio of the distance A to the standing ring diameter will be from about 7:1 to about 17:1.

When the container is under a negative pressure (FIGS. 17 and 43), the pressure compensating panel will deflect as shown in FIG. 43.

When the container is under positive pressure (FIG. 19), the distance A" will be from about 0.050 inches (0.127 cm) to about 0.110 inches (0.279 cm) for a container having a standing ring 27 with a diameter of 2.678 inches (6.802 cm). Thus, the ratio of (A-A")/standing ring diameter is from about 27:1 to about 38:1. Further, the difference between A" and N defines the flex range of the panel and, for a container having a standing ring diameter of 2.678 inches (6.802 cm), the flex range will be from 0.450 inches (1.143 cm) to about 0.640 inches (1.626 cm) for a ratio of flex range to standing ring diameter of from about 4:1 to about 6:1.

In one preferred form of the invention, the container will be formed in a blown extrusion process where a preform is inserted into a blow mold and blown into an intermediate container having an axial dimension greater than the axial dimension of a finished container and forming the pushup section of the container. FIGS. 20-22 show one preferred blow mold station 70 having a wall 72 defining a cavity having the desired shape of the intermediate container. A pushup member or cavity insert 76 forms a bottom wall of the cavity and is mounted for reciprocating translational movement along an axis of the cavity from a first position outward of the cavity (FIGS. 20, 21) to a second position (FIG. 23) axially inward. The pushup member has an outer surface 77 having a surface profile necessary to form the desired pressure compensating base discussed above with reference to FIGS. 3-19. FIGS. 20-22 also show a carrier 78 for holding a top portion of the preform during conveyance of the preform to the blow mold station 70.

FIGS. 20-22 show a stretch rod 80 mounted for reciprocating translational motion along an axis of the cavity. In a first position shown in FIG. 20, the stretch rod 80 initially contacts a bottom portion 82 of the preform. The preform is then blown into contact with an inner surface of the cavity to form the intermediate container 84 having a wall 43. The stretch rod 80 is moved to a second position where it stretches the intermediate container 84 in an axial direction beyond the desired axial dimension of the finished container to define an overstretched position or overstretched container. The container is overstretched along an axial direction from about 15 mm to 40 mm, more preferably from about 20 mm to about 35 mm, and most preferably from about 20 mm to about 30 mm greater than the axial dimension of the finished container. FIG. 22 shows the pushup member or insert 76 advancing axially inwardly to stretch the overstretched intermediate container into a smaller axial dimension than when overstretched.

FIGS. 23-28 show a second embodiment of a blow station, which is the same in all respects to the blow station discussed with respect to FIGS. 20-22, with the exception of having a two-piece pushup assembly 76' having a first section 98 and a second section 100 coaxially disposed about the first section 98. FIGS. 23-25 show three sequential steps in closing a mold and FIGS. 26-28 show three sequential steps in opening a mold.

FIG. 23 shows a blow mold having first and second portions 101 *a,b*, separated from one another forming a gap 102. The first and second portions 101 *a,b*, are mounted for reciprocal translational movement from an open position to a closed position. When in the open position shown in FIG. 23, a finished container (not shown) is removed from the mold and a new preform is inserted. When in the closed position, the process of blow molding the container occurs.

The first and second pushup sections 98 and 100 are also mounted for reciprocating translational motion from retracted positions to molding positions independent of one another. In a preferred form of the invention, the pushup sections will move along a line that is transverse to the line upon which the first and second mold portions 101 *a,b* move and even more preferably in a line essentially perpendicular thereto. In another preferred form of the invention, both the first and second pushup sections 98 and 100 are capable of being independently moved axially away from the mold and independently into the mold. That is, the first section 98 and the second section 100 are mounted for reciprocating translational motion between positions inside the mold cavity and outside the mold cavity independent of one another. In a preferred form of the invention, the first and second sections 98 and 100 are capable of being independently moved axially into the mold cavity from a retracted position to a molding position. FIG. 23 shows the first and second sections 98 and 100 in a retracted position, FIG. 24 shows second section 100 in a molding position with the first section 98 in the retracted position and FIG. 25 shows both the first and second sections 98 and 100 in the molding position.

The first section 98 has a surface 99 for forming one annular section of the bottom of the container and the second section 100 has a surface 101 for forming a second annular section of the bottom and the second section is preferably concentrically disposed about the first section. More preferably, the first section 98 has a surface 99 for forming portions of the bottom panel axially inwardly of the annular upstanding wall 29 including features discussed above with reference to FIGS. 1-19. The second section 100 forms the portions of the bottom panel from the standing ring 27 axially inwardly to and including the upstanding wall 29.

The present invention provides a three-step method for closing (FIGS. 23-25) and opening (FIGS. 26-28) the mold. FIG. 23 shows the two portions of the mold 101 *a,b* in a first open position and the two sections of the pushup 98 and 100 in their retracted positions. FIG. 24 shows the two portions of the mold 101 *a,b* after moving in the direction of the arrows to a second closed position, the first section of the pushup 98 having moved axially inwardly into the molding position, and the second pushup section 100 remaining in its retracted position. In the second closed position, the standing ring 27 and upstanding wall 29 are formed. FIG. 25 shows the two portions of the mold 101 *a,b* in a third, closed position having the two sections of the pushup 98 and 100 in their molding positions. In the third, closed position, the flexible panel wall is formed and the finished container is formed.

FIG. 26 shows the two portions of the mold 101 *a,b* have moved to an open position and the two sections of the pushup 98 and 100 are in their molding positions. The finished container is exposed to ambient conditions and begins to cool. FIG. 27 shows the next step: while the two mold portions 101 *a,b* are in an open position, the first section 98 of the pushup is moved to its retracted position while the second section 100 remains in its molding position and continues to provide support to the finished container. FIG. 28 shows the two mold portions 101 *a,b* in the open position and both of the two sections of the pushup 98 and 100 are in their retracted positions. Thus, the position of the blow station shown in FIG. 28 is the same position as shown in FIG. 23. It is in this position when the finished container is removed from the mold and a new preform is inserted and the process is repeated.

FIGS. 29-34 show six embodiments of the wave-type bases 110 having the upstanding wall 29, a contact ring 114, and an axially inwardly extending pressure relief section 116 spaced radially inwardly from the contact ring 114. The pressure relief section 116 is asymmetrical in cross sectional dimension and under static conditions so that one portion of the pressure relief section 116 yields under a first pressure and a second portion of the pressure relief section 116 yields under a second pressure different from the first pressure (see FIGS. 39-42). In one preferred form of the invention, the pressure relief section 116 has a first generally vertically extending wall 118, a first radially inwardly extending rounded transition 120, a second generally vertically extending wall 122, a second radially inwardly extending rounded transition 124, a first transition panel 126, a second transition panel 127, and a central push up 128. The first and second transition panels 126, 127 define a generally toroidal-shaped channel circumscribing the central pushup 128. The second rounded transition 124 has portions spaced apart by 180°. The radius of curvature of the first portion is different from the radius of curvature at the second portion to define an asymmetric pressure relief panel. Thus, there will be a radii of curvature gradient between a maximum and a minimum. In one preferred form of the invention, the maximum and minimum radii of curvature will be separated by 120° and in another form of the invention by 180°. FIGS. 29-34 show the 180° embodiment. In the embodiment where the maximum and minimum are separated by 120° there will be one 120° segment going from the minimum curvature to the maximum curvature, a second 120° segment going from the maximum curvature to the minimum curvature, and finally a third 120° segment where there is no change in the radius of curvature. The first rounded transition 120 has opposed rounded sections 130, 132 and a straight section 134 therebetween.

Figure 29:
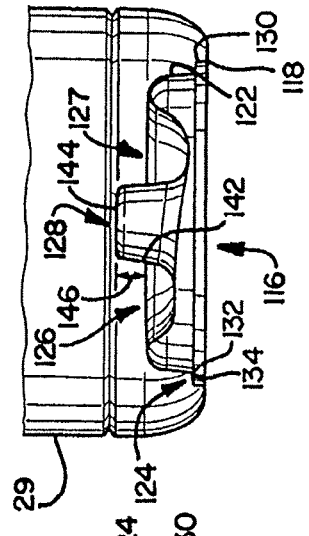
FIGS. 29-34 are side sectional views of a base of a container having a progressive-type or wave-type release rate.
Figure 31:
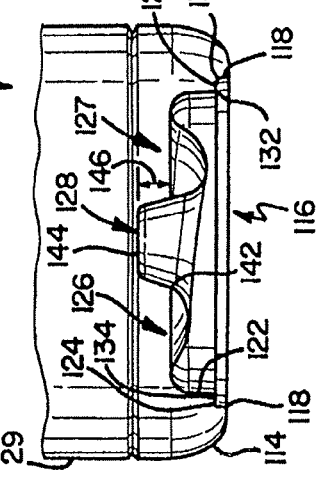

Due to the radii of curvature gradients in the 180° embodiment, the first and second transition panels 126 and 127 have geometries that differ in at least one dimension to render the shape of the pressure relief section 116 asymmetrical. In the 120° embodiment, there would be three segments or panels of differing shapes with a first panel having an upwardly sloping surface from the minimum to the maximum, a second panel with a downwardly sloping surface from the maximum to the minimum, and a third panel that is essentially flat with a constant radius of curvature over the entire surface. FIGS. 29, 31 have generally concave or semi-circular shaped transition panels 126 and 127 with the radius of curvature of the panels being different from one another. More particularly, in FIGS. 29 and 31 the second transition panel 127 has an axially deeper shape than the first transition panel 126, and, therefore, presents greater resistance to yielding under negative pressure within the container and less resistance to yielding under positive pressure within the container.

Figure 30:
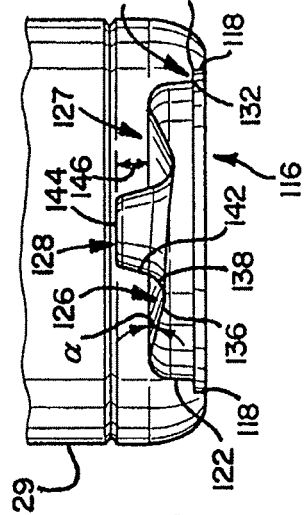
Figure 32:
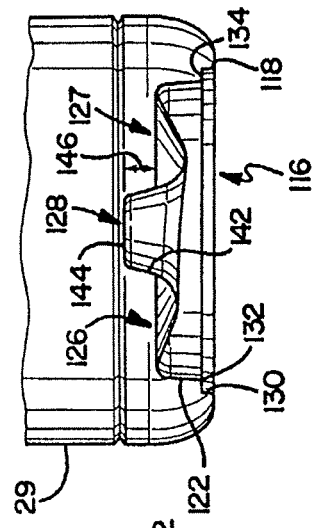
Figure 33:
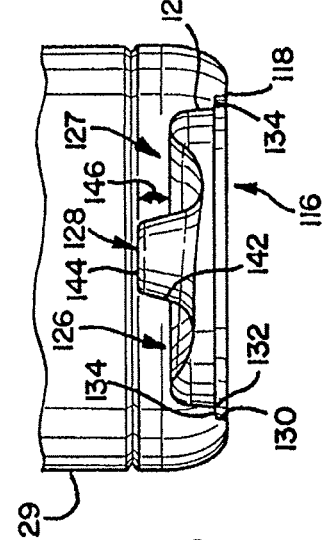
Figure 34:
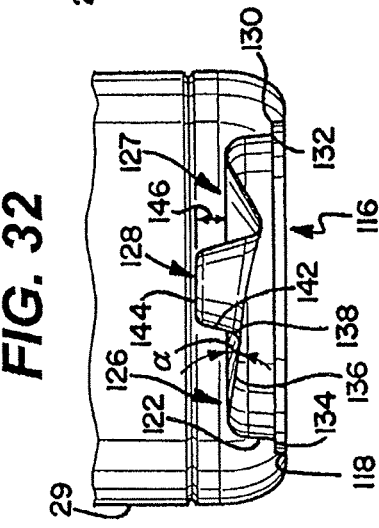

In another preferred form of the invention, the pressure relief section 116 is asymmetric under static conditions due to having differences in the slope of the section from the second transition at various circumferentially spaced points along a top of the perimeter wall to define a slope angle gradient between a maximum and a minimum. In FIGS. 30 and 32, the transition panels 126, 127 have a first leg 136 and a second leg 138. The first leg 136 is generally downwardly sloping and radially inwardly extending along a straight line and the second leg 138 is rounded. The downwardly sloping line forms an angle α with a horizontal line (radial) of from about 5 degrees to about 45 degrees and more preferably from about 10 degrees to about 30 degrees. Asymmetry results from differing a angles of the first leg 136 of each of the first and second transition panels 126 and 127.

In a preferred form of the invention, the difference in the α angles between the first and second transition panels 126, 127 will be from about 3 degrees to about 30 degrees and more preferably from about 5 degrees to about 20 degrees. The α angles of the first and second transition panels 126, 127 of FIG. 27 are 15° and 27°.

Figure 35:
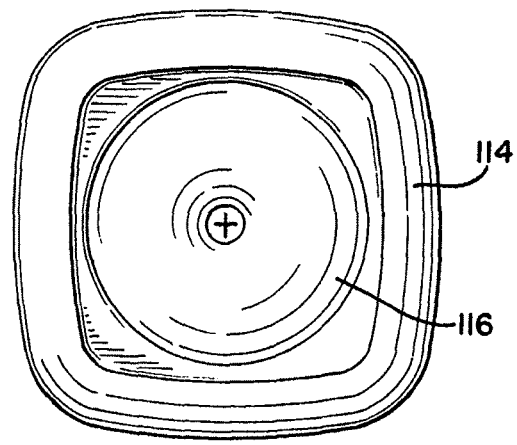
FIGS. 35 and 36 respectively are a bottom view and a side sectional view of a wave or progressive base with a generally circular pressure relief section within a generally square standing ring.
Figure 36:
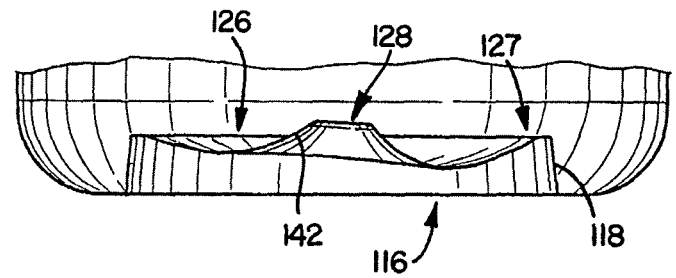
Figure 37:
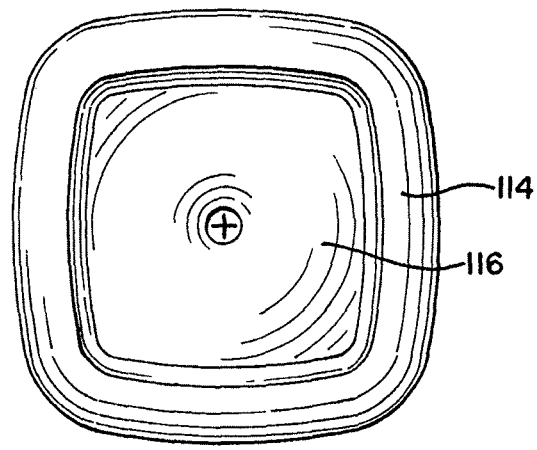
FIGS. 37 and 38 respectively are a bottom view and a side sectional view of a wave or progressive base with a generally square pressure relief section within a generally square standing ring.
Figure 38:
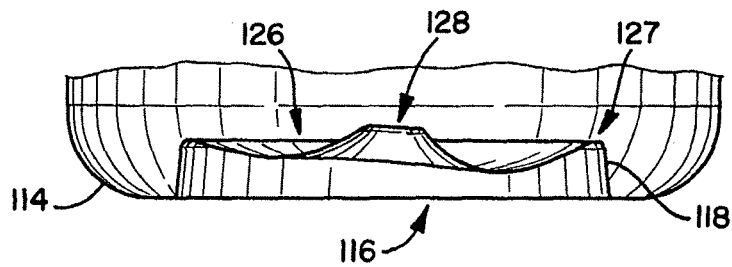

FIGS. 35 and 36 show the pressure relief section 116 has a generally round shape and FIGS. 37 and 38 show the pressure relief section 116 has a generally square shape. The contact ring 114 in FIGS. 35-38 is generally square shaped with rounded vertices. It should be understood, however, that it is contemplated both the pressure relief section 116 and the contact ring 114 could have other shapes such as circular, oval, polygonal, and irregular without departing from the scope of the present invention.

In a preferred form of the present invention, the push up 128 is generally a truncated cone having a generally vertically extending wall 142 tapering axially inwardly from a first point to a second point axially inwardly from the first and having a generally flat top wall 144. In a preferred form of the invention, the top wall 144 of the push up 128 will extend axially inwardly beyond the second transition panel 126 by a distance 146 within the range of from about 0.625 inches (1.587 cm) to about 1.125 inches (2.857 cm).

Figure 39:
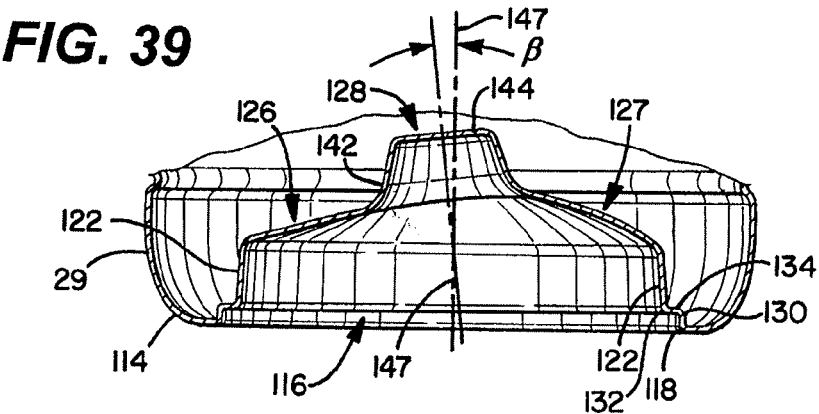
FIGS. 39-42 show side elevation views of a representative wave base on a container respectively under various pressure conditions including under vacuum with the base fully inverted, under vacuum with the base partially inverted, under static pressure conditions and under positive pressure.
Figure 40:
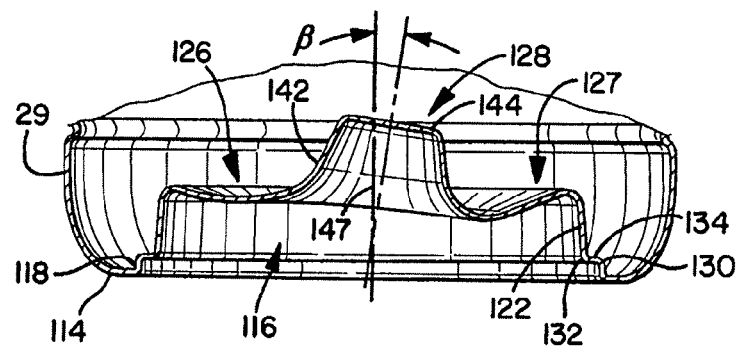
Figure 41:
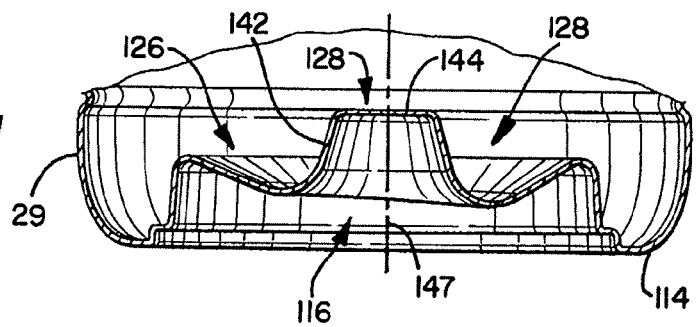
Figure 42:
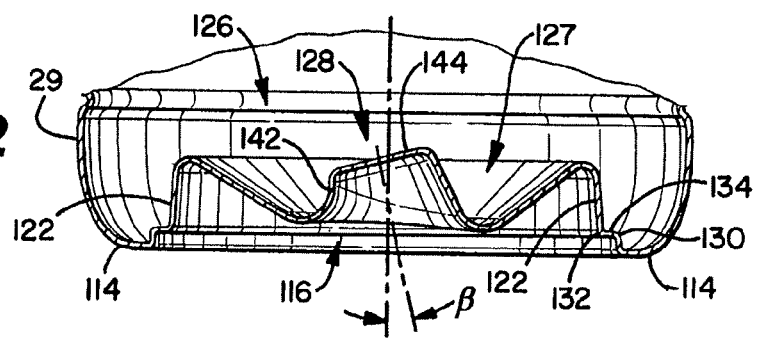

FIGS. 39-42 show a representative wave-type base 110 in various pressure conditions. FIG. 39 shows the first and second transition panels 126 and 127 fully inverted in response to a vacuum or negative pressure within the container. FIG. 40 shows the first transition panel 126 beginning to invert causing the upper surface of the pushup 128 to form an angle β with an axis 147. FIG. 41 shows the base 110 when the pressure in the container is at atmospheric pressure. FIG. 42 shows the base 110 flexed axially outwardly in response to a positive pressure within the container.

For containers in need of enhanced gas or water vapor transmission rates, a barrier layer or coating can be used provided the material has no adverse effects on the intended use of the container. One suitable coating material is a silicon oxygen coating (SiOx) deposited on a surface of the container, preferably on an interior surface, using techniques such as plasma deposition. Other suitable barrier materials and coatings are well known to those skilled in the art.

The present invention provides a method for forming a polymeric container including the steps of: (1) providing a blow mold having a chamber and an opening into the chamber at one end, the blow mold being moveable between an open position and a closed position, a pushup member is positioned in the opening to close the chamber, the pushup member having a surface extending into the chamber for defining a bottom wall of the container; (2) inserting a preform within the blow mold; and (3) blowing the preform against the chamber to form a container having a base, the base having an outer perimeter portion defining a support structure, an axially inwardly extending perimeter wall spaced radially inwardly from the support structure foaming an angle with a horizontal line of greater than about 80°, and a pressure compensating panel closing an end of the perimeter wall, the pressure compensating panel being moveable along an axis of the container from a first position where a central portion of the panel is below a top portion of the perimeter wall to a second position where the central portion is above the top portion of the perimeter wall to change the volume of the container, and a plurality of circumferentially spaced radial grooves on the panel.

The present invention also provides a method for releasing a blow molded container from an extrusion blow mold including the steps of: (1) providing a blow mold having a chamber and an opening into the chamber at one end, the blow mold being moveable between an open position and a closed position and having a container positioned in the chamber; (2) providing a two-piece pushup assembly positioned in the opening to form a bottom wall of the blow mold and having a first portion and a second portion; (3) moving the blow mold to the open position; (4) withdrawing the first portion away from the mold while the second portion remains in the mold; (5) withdrawing the second portion away from the mold; and (6) removing the container from the chamber.

From the foregoing, it will be observed that numerous variations and modifications may be effected without departing from the spirit and scope of the invention. It is to be understood that no limitation with respect to the specific apparatus illustrated herein is intended or should be inferred. It is, of course, intended to cover by the appended claims all such modifications as fall within the scope of the claims.

We claim:
1. A plastic container comprising:
   a vertical sidewall defining a chamber and having a first end and a second end and an opening at the first end into the chamber;
   a base extending from the sidewall and closing the second end, the base having an outer perimeter portion defining a support structure, an axially inwardly extending perimeter wall spaced radially inwardly from the support structure forming an inwardly-directed angle with a horizontal line perpendicular to the sidewall of greater than about 80°, a centrally disposed pushup section in the shape of an axially inwardly extending truncated cone, and a toroidal-shaped channel circumscribing and connecting the perimeter wall to the pushup section, wherein a thickness of the base is thinner than a thickness of the sidewall,
   the toroidal-shaped channel having a surface that is asymmetrical about a central axis of the container when the container is under static pressure conditions so that one portion of the toroidal shaped channel yields under a first pressure and a second portion of the toroidal shaped channel yields under a second pressure different from the first pressure, wherein the toroidal-shaped channel includes a first transition panel and a second transition panel and the second transitional panel has an axially deeper shape than the first transition panel under static conditions.
2. The container of claim 1 wherein the surface of the toroidal-shaped channel has a rounded transition having a first radius of curvature at a first point and a second radius of curvature at a second point circumferentially spaced from the first point, the first radius of curvature being different from the second radius of curvature to define a radii of curvature gradient.
3. The container of claim 2 wherein the first point is spaced from about 120° to about 180°.
4. The container of claim 1 wherein the surface of the toroidal-shaped channel has a first leg and a second leg circumferentially spaced from the first leg, the first leg forming a first angle with the horizontal line and the second leg forming a second angle with the horizontal line and the first angle is different from the second angle defining an angle gradient therebetween.
5. The container of claim 4 wherein the maximum difference between the first angle and the second angle is less than about 30°.
6. The container of claim 1 wherein the truncated cone has a top surface that forms varying angles with a horizontal support surface when the container collapses.

7. A plastic container comprising:
a sidewall defining a chamber and having a first end and a second end and an opening at the first end into the chamber; and
a base extending from the sidewall and closing the second end, the base having an upstanding wall, a contact ring, and an axially inwardly extending pressure relief section spaced radially inwardly from the contact ring including:
a first generally vertically extending wall,
a first radially inwardly extending rounded transition including a first rounded section adjacent to the first generally vertically extending wall, a second rounded section, and a straight section between the first rounded section and a second rounded section,
a second generally vertically extending wall adjacent to the second rounded section,
a second radially inwardly extending rounded transition adjacent to the second generally vertically extending wall,
a central pushup, and
a first transition panel and a second transition panel defining a generally toroidal-shaped channel between the central pushup and the second radially inwardly extending rounded transition,
wherein the pressure relief section is asymmetrical in cross sectional dimension and the second transition panel has an axially deeper shape than the first transition panel under static conditions so that one portion of the pressure relief section yields under a first pressure and a second portion of the pressure relief section yields under a second pressure different from the first pressure.

8. The container of claim 7 wherein one of the rounded transitions has a first radius of curvature at a first point and a second radius of curvature at a second point circumferentially spaced from the first point, the first radius of curvature being different from the second radius of curvature to define a radii of curvature gradient between a maximum and a minimum.

9. The container of claim 8 wherein the maximum and minimum radii of curvature are separated by about 120°.

10. The container of claim 8 wherein the maximum and minimum radii of curvature are separated by about 180°.

11. The container of claim 7 wherein each of the transition panels has a first leg and a second leg, with the first leg sloping generally downwardly and extending radially inwardly along a straight line and the second leg being rounded, the downwardly sloping line forming an angle with a horizontal line of from about 5° to about 45°.

12. The container of claim 11 wherein the angles of the first leg of each of the first and second transition panels differ, creating the asymmetry of the pressure relief section.

13. The container of claim 12 wherein the maximum difference between the angles of the first leg of each of the first and second transition panels is less than about 30°.

14. The container of claim 7 wherein the pressure relief section has a generally round shape.

15. The container of claim 7 wherein the pressure relief section has a generally square shape.

16. The container of claim 7 wherein the contact ring is generally square shaped with rounded vertices.

17. The container of claim 7 wherein the pushup is a generally truncated cone having a generally vertically extending wall tapering axially inwardly from a first point to a second point axially inwardly from the first point and having a generally flat top wall.

18. The container of claim 17 wherein the top wall of the pushup extends axially inwardly beyond the second transition panel by a distance within the range of from about 0.625 inches to about 1.125 inches.

19. A plastic container comprising:
a sidewall defining a chamber and having a first end and a second end and an opening at the first end into the chamber; and
a base extending from the sidewall and closing the second end, the base having an upstanding wall, a contact ring, and an axially inwardly extending pressure relief section spaced radially inwardly from the contact ring, wherein a thickness of the base is thinner than a thickness of the sidewall,
wherein the pressure relief section is asymmetrical in cross sectional dimension under static conditions so that one portion of the pressure relief section yields under a first pressure and a second portion of the pressure relief section yields under a second pressure different from the first pressure,
wherein the pressure relief section has:
a first generally vertically extending wall,
a first radially inwardly extending rounded transition including a first rounded section adjacent to the first generally vertically extending wall, a second rounded section, and a straight section between the first rounded section and a second rounded section,
a second generally vertically extending wall,
a second radially inwardly extending rounded transition,
a first transition panel,
a second transition panel, and
a central pushup forming a generally truncated cone having a generally vertically extending wall tapering axially inwardly from a first point to a second point axially inwardly from the first point and having a generally flat top wall,
wherein the first and second transition panels define a generally toroidal-shaped channel circumscribing the central pushup and the second transitional panel has an axially deeper shape than the first transition panel under static conditions, and
wherein one of the rounded transitions has a first radius of curvature at a first point and a second radius of curvature at a second point circumferentially spaced from the first point, the first radius of curvature being different from the second radius of curvature to define a radii of curvature gradient between a maximum and a minimum.

20. The plastic container of claim 1, wherein the axially inwardly extending perimeter wall has a diameter equal to about 70% to about 95% of a diameter of the support structure.

21. The plastic container of claim 1, wherein the thickness of the base is about 30% to about 60% thinner than the thickness of the sidewall.

22. The plastic container of claim 7, wherein a thickness of the base is thinner than a thickness of the sidewall.

23. The plastic container of claim 22, wherein the thickness of the base is about 30% to about 60% thinner than the thickness of the sidewall.

24. The plastic container of claim 7, wherein the axially inwardly extending pressure relief section has a diameter equal to about 70% to about 95% of a diameter of the contact ring.

25. The plastic container of claim 19, wherein the thickness of the base is about 30% to about 60% thinner than the thickness of the sidewall.

26. The plastic container of claim 19, wherein the axially inwardly extending pressure relief section has a diameter equal to about 70% to about 95% of a diameter of the contact ring.

* * * * *